Patented Mar. 25, 1947

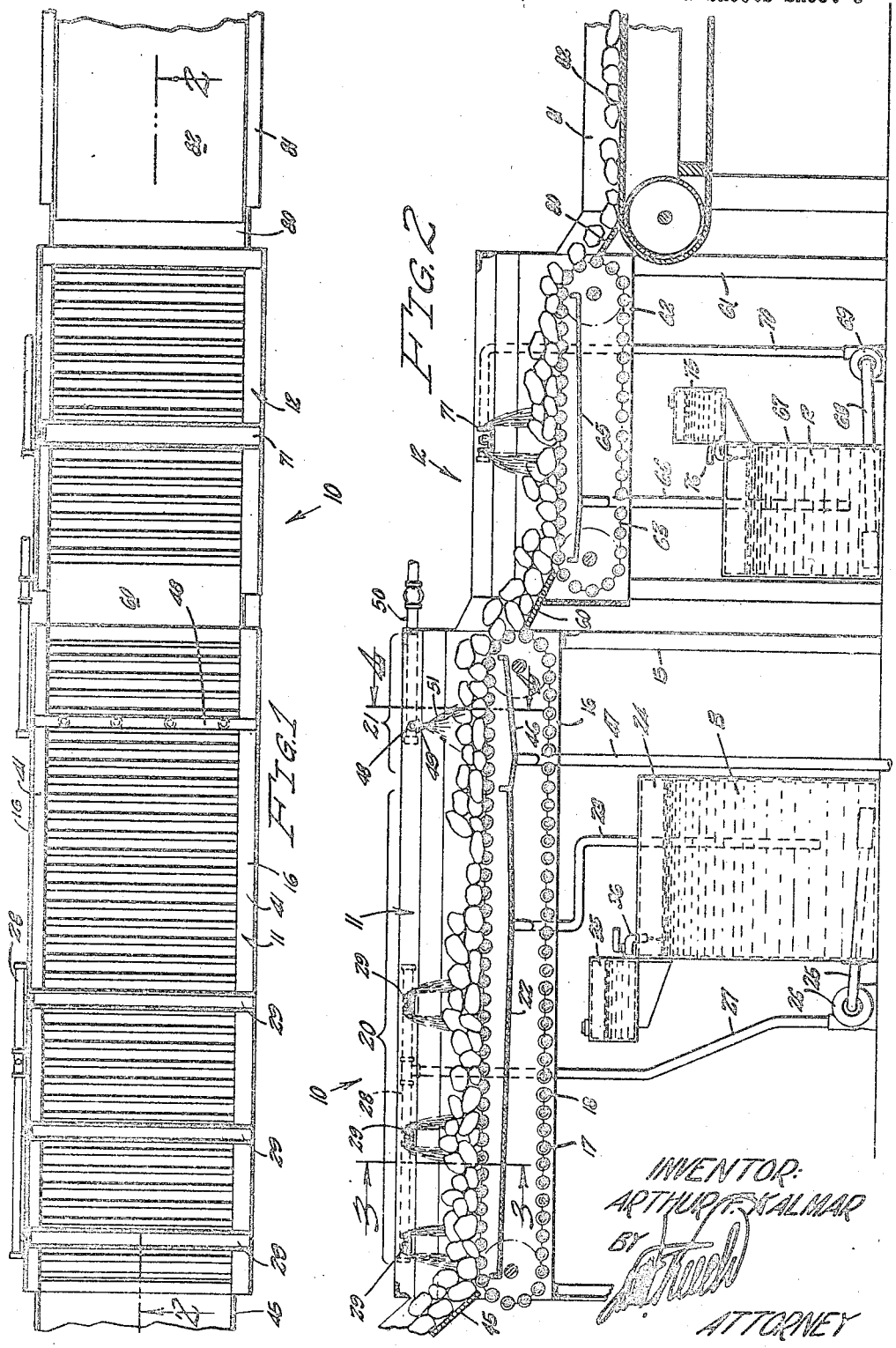

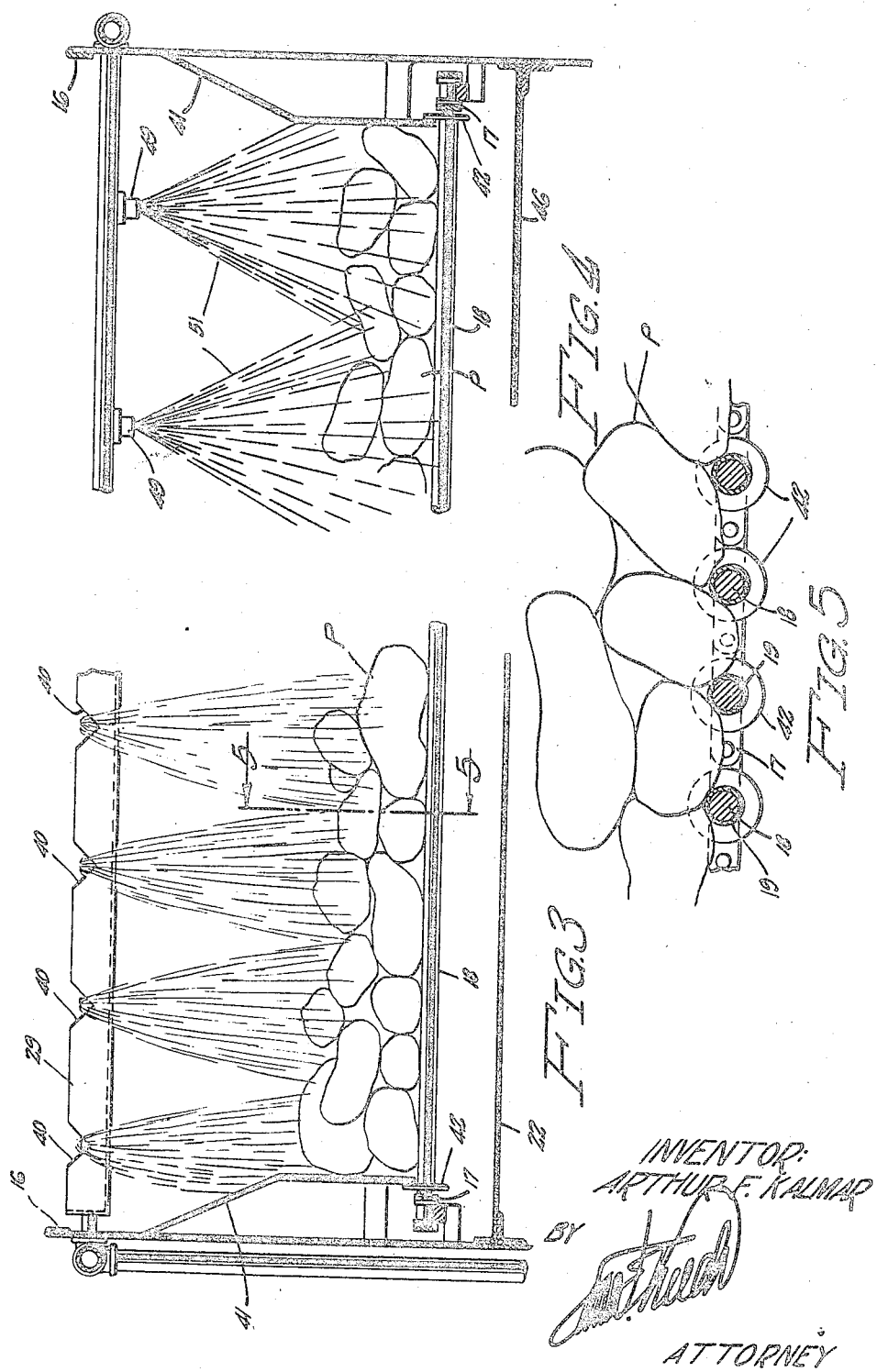

2,417,932

UNITED STATES PATENT OFFICE 2,417,932

POTATO TREATING PROCESS

Arthur F. Kalmar, Riverside, Calif., assignor to Food Machinery Corporation, San Jose, Calif., a corporation of Delaware Application June 19, 1943, Serial No. 491,521

10 Claims. (Cl. 99—154)

This invention has to do with the treatment of fruit and vegetables for the prevention of decay and for improving the appearance of these. Although adapted to be employed in treating other fruits and vegetables, it is especially useful in the treatment of potatoes.

It is a broad object of this invention to provide a process of treating potatoes and particularly White Rose potatoes, so as to improve the appearance of the potatoes and lessen the decay of these en route to market. Although the process of my invention is not limited to the treatment of White Rose potatoes, this is the main variety grown in Southern and Central California, and the invention will therefore be described for illustrative purposes as applied to this variety.

Potato producers have for long been conscious of the effect which the appearance of potatoes have on the prices they bring, but hitherto have done little more along this line than to wash the potatoes to remove the soil of the field. A considerable portion of the California potato crop is harvested when only partially matured, because early potatoes bring higher prices and because heat and tuber moth may cause injury if the crop is allowed to grow until the vines die. Since the skin of immature potatoes is very thin, it is easily rubbed off in the digging, washing, crating and loading operations, and these skinned areas during the first weeks of the harvest sometimes exceed the unskinned areas. The skinned areas turn dark brown quite rapidly through oxidation. This discoloration is accelerated by exposure to hot air before washing or in transit. Because of the unattractive appearance produced thereby, the severe discoloration of tubers has resulted in low market prices.

It is another object of my invention to provide a process of treating potatoes which will to a substantial degree overcome this discoloration.

It is yet another object of my invention to provide a process for treating potatoes which will not only substantially overcome the discoloration of the skinned areas but which will, to a material degree, lighten the color of the unskinned areas.

It is a still further object of my invention to provide a process for treating potatoes which will substantially prevent the transmission of infections from one potato to another in the washing process without inducing the discoloration of the skinned areas above referred to.

The method of my invention embraces essentially the application of two agents to the potatoes in successive treatments. The first of these agents operates as a detergent, a fungicide and a bleaching agent. Its action is ordinarily accompanied by oxidation. The agent applied in the second treatment of my process is a reducing agent or deoxidizer.

The agent employed in the first treatment of my process which may be adapted to serve primarily as a detergent or as a fungicide or as a bleaching agent, also acts through oxidation to increase the rate of enzymatic discoloration of those areas of the surfaces of the potatoes which are exposed to atmospheric oxygen following the treatment.

The reducing agent applied in the second treatment of my process does not undo the good work of the first agent, but complements this by undoing its detrimental effects. In particular the reducing agent reverses the oxidation of the exposed phelloderm in the skinned areas on the potatoes which has been caused by the agent of the first treatment and practically restores the condition of this phelloderm to what it was prior to the application of the first agent.

I have also found that the reducing agent applied in the second treatment of my process not only reverses the detrimental action of the first agent without interfering with the beneficial results of its application, but the second agent enhances the good effects of the first agent by tending to brighten the unskinned areas of the potatoes which have been yellowed by the application of the first agent thereto and leaves these with a much more natural appearance and without reversing the bleaching reaction of the first agent.

The agent which I prefer to use in the first step of the method of my invention is a hypochlorite of an alkali-forming metal. By alkali-forming metal, I mean those metals (like sodium and calcium) the oxides and hydroxides of which are commonly referred to as "alkalies." Of these hypochlorites I prefer to use sodium hypochlorite. While the strength of this may vary, depending upon the length of the treatment and the objects to be achieved, I find that where bleaching and disinfection are the primary ends in view, good results are produced on White Rose potatoes by using a solution of sodium hypochlorite containing 2% of available chlorine for a treatment of 30 seconds or a 1% available chlorine solution for a treatment of one minute.

An agent suitable for use in the second step of my process may be selected from a group as follows: sulphites, bisulphites, metabisulphites and thiosulphates of alkali forming metals. I have found sodium bisulphite especially suitable for use as this agent. The desired reaction in the second treatment of my process may generally be obtained by applying a solution of .25% to 1.% of sodium bisulphite to the potatoes for a period of 5 to 15 seconds. I prefer to apply an excess of the reducing agent in this second treatment over that required to neutralize the hypochlorite remaining on the potatoes and then let the reducing agent solution dry on the potatoes. The values given are merely illustrative, of course, as considerable variation in the choice of agents, the concentrations used and the periods of treatment are allowable without substantial loss of the benefits of the treatment. The group of reducing agents above named as suitable for use in the second step of my process, may also be correctly designated as sulphur-containing antichlors.

As whatever quantity of hypochlorite remaining on the potatoes after the first treatment absorbs a chemical equivalent of the reducing agent applied in the second treatment, it is desirable that the potatoes be rinsed between the two treatments to remove as much of the hypochlorite as possible. A reducing agent such as sodium bisulphite which is allowed to remain on the potatoes at the conclusion of the process, tends to retard enzymatic oxidation of the skinned areas and their consequent discoloration while the potatoes are on their way to market. The residue of this agent also acts to protect the potato against reinoculation by spoilage organisms.

The agents in each of the treatments of my process may be applied either by soaking the potatoes in a solution of the agent or by flooding the solution over the potatoes. I have found equally satisfactory results may be obtained by these two modes of application, but for purposes of control of the process I prefer to use the flood application in both treatments.

The process of my invention is preferably performed continuously on a stream of potatoes conveyed through various pieces of equipment disposed in series. Thus the potatoes may pass consecutively through a potato washer, a mechanical sizer, through the apparatus performing the method of my invention, and finally over a grading table from which the potatoes are sacked.

Specific formulas for the solutions in the two treatments of my process which I have found to give especially good results in treating White Rose potatoes in California, are as follows:

*Primary solution*

| | Per cent by weight |
|---|---|
| Sodium hypochlorite, expressed as available chlorine | 1.0 |
| Water and inert salts | 99.0 |
| | 100.0 |

*Secondary solution*

| | |
|---|---|
| Sodium bisulphite | .25 |
| Water | 99.75 |
| | 100.00 |

The process of my invetion is, of course, intended to be performed with apparatus which in the packing shed system above outlined would receive the potatoes from the pre-washer or sizer and after processing these with the process of my invention would deliver the potatoes to the grading table.

In the accompanyig drawings:

Fig. 1 is a plan view of an apparatus suitable for performing the process of my invention.

Fig. 2 is a longitudinal sectional view taken on the line 2—2 of Fig. 1.

Fig. 3 is an enlarged fragmentary sectional view taken on the line 3—3 of Fig. 2, and illustrating the flooding of the solution on the potatoes in the primary treatment of my process.

Fig. 4 is an enlarged fragmentary cross sectional view taken on the line 4—4 of Fig. 2, and illustrates the rinsing of the solution of the primary treatment from the potatoes by spraying rinse water thereon.

Fig. 5 is an enlarged detail sectional view taken on the line 5—5 of Fig. 3 and illustrating the manner in which the potatoes are supported on the conveyors of the apparatus.

Referring specifically to the drawings, an apparatus 10 is shown therein for performing the process of my invention, this apparatus including a primary treatment and rinse unit 11 and a secondary treatment unit 12.

The unit 11 includes a frame 15 having side walls 16 between which is mounted an endless conveyor 17 having an endless series of rolls 18 which are preferably provided with a chemically inactive covering 19 such as of rubber or a suitable inert synthetic material. The conveyor 17 includes a primary treatment section 20 and a rinse section 21. Disposed beneath the upper run of the conveyor 17 in the primary treating section 20 is a drain pan 22, from which a pipe 23 leads to a primary treating solution tank 24 containing a primary treating solution B. Connected to the bottom of the tank 24 and drawing solution B therefrom through a pipe 25 is a motor-driven pump 26 which discharges this solution through a pipe 27 and a manifold 28 into a series of flooding troughs 29 disposed transversely over the primary treatment section 20 of the conveyor. Mounted above the tank 24 is a concentrate reservoir 35 having a valve 36 through which concentrate from the reservoir 35 may be allowed to trickle into the body of the solution B contained in the tank 24 to maintain the concentration of this substantially constant.

The troughs 29 (see Fig. 3) have a series of weir notches 40 along their sides through which solution B is adapted to be poured to flood potatoes P carried on the conveyor 17, with this solution. Guards 41 provided on the side walls 16 cooperate with flanges 42 formed of the roll covering material aforesaid, to retain the potatoes on the conveyor and prevent the solution having direct access to the conveyor chains.

Positioned at the receiving end of the unit 11 is a drop board 45 over which the potatoes are adapted to be delivered, as from a sizer (not shown) onto the conveyor 17.

Disposed beneath the upper run of the conveyor 17 and the rinsing section 21 of the unit 11 is a drain pan 46 from which a pipe 47 connects with the sewer. Extending transversely across the unit 11 above the conveyor 17 in the rinsing section 21 is a fresh water rinse pipe 48 having a series of spray nozzles 49 from which water is adapted to be sprayed downwardly as shown in Fig. 4, on potatoes carried on the conveyor 17 through this section. Fresh rinse water is delivered to the pipe 48 through a valved pipe 50 connecting with the domestic water system to produce sprays 51.

Unit 12 is placed slightly below the unit 11 and in position to receive the potatoes discharged from the latter over a drop board 60. The unit 12 includes a frame 61 having side walls 62 between which is mounted an endless conveyor 63 which corresponds in construction to but is considerably shorter than the conveyor 17. Mounted beneath the upper run of the conveyor 63 is a drain pan 65 from which a pipe 66 leads downwardly into a secondary solution tank 67 which contains a secondary treating solution R. Connected to the bottom of the tank 67 and drawing solution therefrom through a pipe 68 is a motor-driven pump 69 which discharges this solution into a pipe 70 through which it is conducted to a flood trough 71 mounted transversely across the unit 12 above the pan 65. The trough 71 is similar in construction to the troughs 29 described hereinabove.

Mounted above the tank 67 is a concentrate reservoir 75 having a valve 76 through which concentrate from the reservoir 75 may be allowed to trickle into the body of solution R contained in the tank 67 to maintain the concentration of this substantially constant.

Potatoes are discharged from the conveyor 63 over a drop board 80 onto a grading table 81 having a horizontal conveyor belt 82 for conveying the potatoes away from the apparatus 10.

Suitable power means (not shown) is provided for driving the conveyors 17, 63 and 82, and for operating the pumps 26 and 69.

Before commencing commercial practice of the method of my invention with the apparatus 10, tanks 24 and 67 are charged with primary and secondary treating solutions B and R and the reservoirs 35 and 75 are charged with quantities of concentrates and the valves 36 and 76 turned on to permit trickling of the concentrates into the respective solutions to maintain the strength of the latter within suitable operating limits. The operation of the pump 26 now causes a circulation of the solution B by withdrawing the solution from the bottom of the tank, flooding it over the upper run of the conveyor 17, this solution then flowing through the conveyor and returning through the pipe 23 to the tank 24. Likewise the operation of the pump 69 causes circulation of the secondary treating solution R, by withdrawing it from the bottom of the tank 67, flooding it over the upper run of the conveyor 63, this solution then flowing through the conveyor 63 and returning by the pipe 66 to the tank 67.

The apparatus 10 is now in readiness to receive a flow of White Rose potatoes from a washer and sizer preceding the same when this flow starts coming over the drop board 45. The apparatus 10 is preferably operated at such a speed relative to the processing devices delivering potatoes thereto so that these potatoes pile up in layers two or three-deep as shown in Fig. 2. When the preferable conditions aforestated are being followed in the performance of the method of my invention, the solution B is an aqueous solution of sodium hypochlorite containing 1% available chlorine with a concentrate of the same agent being fed thereto from the reservoir 35. The solution R in the tank 67 under these preferred conditions is an aqueous solution of 1% by weight of sodium bisulphite and the reservoir 75 contains a concentrate of the same agent. The valves 36 and 76 remain open during the operation of the process to maintain the strength of the solutions B and R substantially constant.

When the apparatus 10 is in operation the conveyors 17 and 63 travel at the same rate, which is such as to subject the potatoes to the action of solution B while these potatoes are travelling through the primary treating section 20, for the desired length of time for treatment with the primary solution. Under the preferred conditions outlined this period would be approximately one minute.

The primary solution B is now rinsed from the potatoes by the rinse sprays 51. As the secondary treating solution R is allowed to remain on the potatoes after this is flooded over these in the treating unit 12, there is no particular need of a longer treatment of the potatoes with the solution R than that afforded by the single flooding trough 71. This gives the potatoes continuous flooding contact with the fresh solution R for a period of about five seconds and a considerably longer contact with this solution while the latter is drying on the potatoes. After this flooding of solution R on the potatoes is finished, they proceed to the end of the conveyor 63 and gravitate from this over the drop board 80 onto the conveyor 82 of the grading table 81 alongside which sorters stand and grade the potatoes, after which the potatoes are immediately sacked and loaded aboard cars for shipment.

The treatment of White Rose potatoes in the specific example of my process above described produces an attractive light color in the skin of these potatoes which is not present in the potatoes prior to treatment. The improvement in appearance is especially noticeable in those potatoes which have rough, unattractive skins and which are made brighter and cleaner by the oxidizing action of the primary solution.

The hypochlorite when applied by itself, however, has a marked browning effect on the skinned areas and also imparts a yellowishness to the unskinned areas which it bleaches. These undesirable results of the hypochlorite treatment are overcome by the subsequent treatment with a reducing agent so that only the beneficial effects of the hypochlorite remain after the potatoes have passed through the entire process. The yellowing of the unskinned portions of the potato produced by the hypochlorite is believed to be due to the alkalinity of the latter and the elimination of this yellowing by the secondary solution is believed to result from the neutralization of the alkalinity of the yellowed areas.

While the decay in potatoes shipped from California to the eastern markets seldom exceeds 2%, a substantial degree of control of this decay is effected by the process of my invention by the sterilizing action of the hypochlorite on the decay organisms with which the potatoes may have been infected in the washer.

What I claim is:

1. A method of treating potatoes which comprises: contacting the potatoes with an aqueous solution of a hypochlorite of an alkali-forming metal, and subsequently contacting said potatoes with an aqueous solution containing a reducing agent selected from a group consisting of phosphites, sulphites, bisulphites, metabisulphites and thiosulphates of alkali-forming metals.

2. A method of treating potatoes which comprises: contacting the potatoes with an aqueous solution of a hypochlorite of an alkali-forming metal, rinsing said solution from the potatoes and subsequently contacting said potatoes with an aqueous solution containing a reducing agent selected from a group consisting of phosphites, sulphites, bisulphites, metabisulphites and thiosulphates of alkali-forming metals.

3. A method of treating potatoes which comprises: contacting said potatoes with an aqueous solution of a hypochlorite of an alkali-forming metal, and thereafter contacting said potatoes with an aqueous solution of sodium bisulphite.

4. A method of treating potatoes which comprises: contacting the potatoes with an aqueous solution of sodium hypochlorite and thereafter contacting said potatoes with an aqueous solution of sodium bisulphite.

5. A method of treating potatoes which comprises: contacting said potatoes with an aqueous solution of sodium hypochlorite, rinsing said potatoes, and thereafter contacting said potatoes with an aqueous solution containing a reducing agent.

6. A method of treating potatoes which comprises: contacting potatoes with a solution of hypochlorite with a strength of at least 1% available chlorine for a period of at least one minute, rinsing said solution from said potatoes and contacting said potatoes with an aqueous solution of a reducing agent.

7. A method of treating potatoes which comprises: contacting potatoes with a solution of hypochlorite with the strength of at least 1% available chlorine for a period of at least one minute, rinsing said solution from said potatoes and contacting said potatoes with an aqueous solution containing a reducing agent selected from a group consisting of phosphites, sulphites, bisulphites, metabisulphites and thiosulphates of alkali-forming metals.

8. A method of treating potatoes which comprises: contacting the potatoes with an aqueous solution of a hypochlorite of an alkali-forming metal, and subsequently contacting said potatoes with an aqueous solution containing a reducing agent selected from a group consisting of phosphites, sulphites, bisulphites, metabisulphites and thiosulphates of alkali-forming metals, and permitting said solution of reducing agent to remain on said potatoes.

9. A method of treating potatoes which comprises contacting said potatoes with an aqueous solution of a hypochlorite of an alkali-forming metal, and thereafter contacting said potatoes with an aqueous solution of an antichlor.

10. A method of treating potatoes which comprises contacting said potatoes with an aqueous solution of a hypochlorite of an alkali-forming metal, and thereafter contacting said potatoes with an aqueous solution of a sulphur-containing antichlor.

ARTHUR F. KALMAR.

REFERENCES CITED

The following references are of record in the file of this patent:

UNITED STATES PATENTS

| Number | Name | Date |
|---|---|---|
| 2,126,958 | Guha | Aug. 16, 1938 |
| 2,332,151 | Kahnar | Oct. 19, 1943 |
| 1,717,869 | Blumenthal | June 18, 1929 |
| 2,100,942 | Cutler | Nov. 30, 1937 |
| 1,842,720 | Harris | Jan. 26, 1932 |
| 1,842,696 | Slater | Jan. 26, 1932 |
| 2,054,392 | Sharma | Sept. 15, 1936 |
| 2,002,589 | Sharma | May 28, 1935 |